(12) United States Patent
Gu

(10) Patent No.: US 11,505,272 B2
(45) Date of Patent: Nov. 22, 2022

(54) SWEAT ABSORBING DEVICE FOR BICYCLES

(71) Applicant: Haidong Gu, Pomona, CA (US)

(72) Inventor: Haidong Gu, Pomona, CA (US)

(73) Assignee: CYCLINGDEAL USA, INC., Pomona, CA (US)

(*) Notice: Subject to any disclaimer, the term of this patent is extended or adjusted under 35 U.S.C. 154(b) by 90 days.

(21) Appl. No.: 17/219,889

(22) Filed: Apr. 1, 2021

(65) Prior Publication Data
US 2022/0315156 A1     Oct. 6, 2022

(51) Int. Cl.
*B62J 50/00* (2020.01)

(52) U.S. Cl.
CPC ...................... *B62J 50/00* (2020.02)

(58) Field of Classification Search
CPC .................. B62J 50/00; B62J 23/00
See application file for complete search history.

(56) References Cited

U.S. PATENT DOCUMENTS

| | | | | |
|---|---|---|---|---|
| 8,852,712 B1* | 10/2014 | Diaz | ................. | A63B 21/4037 |
| | | | | 428/100 |
| 9,669,893 B2* | 6/2017 | Moos | .................... | B62K 21/26 |
| 9,795,856 B2* | 10/2017 | Seilus | .................... | A63B 71/00 |
| 10,807,668 B2* | 10/2020 | Haley | ....................... | B62J 23/00 |
| D936,528 S * | 11/2021 | Xiang | ......................... | D12/126 |
| 2008/0004168 A1* | 1/2008 | Jackson | ................ | A47C 31/11 |
| | | | | 297/229 |
| 2015/0166140 A1* | 6/2015 | Moos | .................... | B62K 21/26 |
| | | | | 74/551.9 |
| 2016/0303460 A1* | 10/2016 | Seilus | .................... | A63B 71/00 |
| 2018/0184858 A1* | 7/2018 | Kasten | ................... | A63B 71/00 |
| 2020/0070918 A1* | 3/2020 | Haley | ..................... | B62J 23/00 |

FOREIGN PATENT DOCUMENTS

WO     WO-2015014770 A1 *  2/2015  ......... A63B 22/0605

* cited by examiner

*Primary Examiner* — Jacob D Knutson
*Assistant Examiner* — Ryan Edward Hardy

(57) ABSTRACT

A sweat absorbing device includes at least one first strip which has a connection end, and the connection end is connected to a portion of the at least one first strip to form the at least one first strip as a loop. The at least one first strip is removably connected to the handlebar. A sweat absorbing pad has a top face for absorbing sweat, and a bottom face. The at least one first strip is removably connected to the bottom face of the sweat absorbing pad. The sweat absorbing pad can be adjusted relative to the stationary bike so as to properly absorb the rider's sweat.

4 Claims, 11 Drawing Sheets

SWEAT ABSORBING DEVICE FOR BICYCLES

BACKGROUND OF THE INVENTION

1. Fields of the Invention

The present invention relates to sweat absorbing device installed to a bicycle to absorb sweat of the riders.

2. Descriptions of Related Art

Cycling is a popular exercise and the riders can enjoy it indoor or outdoor. Stationary bikes are developed for indoor use and which requires less space. It is noted that the rider drops sweat when using the stationary bikes, and the sweat drops within the space between the seat and the handlebar. The sweat is corrosive and may accelerate the damage of the parts of the stationary bikes.

In view of the above-mentioned problems, products have found in the market to solve this problem. For example, Taiwanese Utility Model No. M417303 discloses "Sweat Pads for Bicycles and Indoor Training Frames", which can be installed between the handlebar and the seat of the stationary bikes. Nevertheless, this product cannot be adjusted so that if the rider adopts a more aggressive riding posture, the product cannot successfully absorb the sweat.

The present mention intends to provide a sweat absorbing device that is adjustable and eliminates the shortcomings mentioned above.

SUMMARY OF THE INVENTION

The present invention relates to a sweat absorbing device and comprises at least one first strip which has a connection end that is connected to a portion of the at least one first strip to form the at least one first strip as a loop. The at least one first strip is removably connected to the handlebar. A sweat absorbing pad has a top face for absorbing sweat, and a bottom face. The at least one first strip is removably connected to the bottom face of the sweat absorbing pad. The sweat absorbing pad can be adjusted relative to the stationary bike so as to properly absorb the rider's sweat. The bottom face of the sweat absorbing pad includes loop-and-hood strip so as to be adjustably and removably connected to the first strip.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
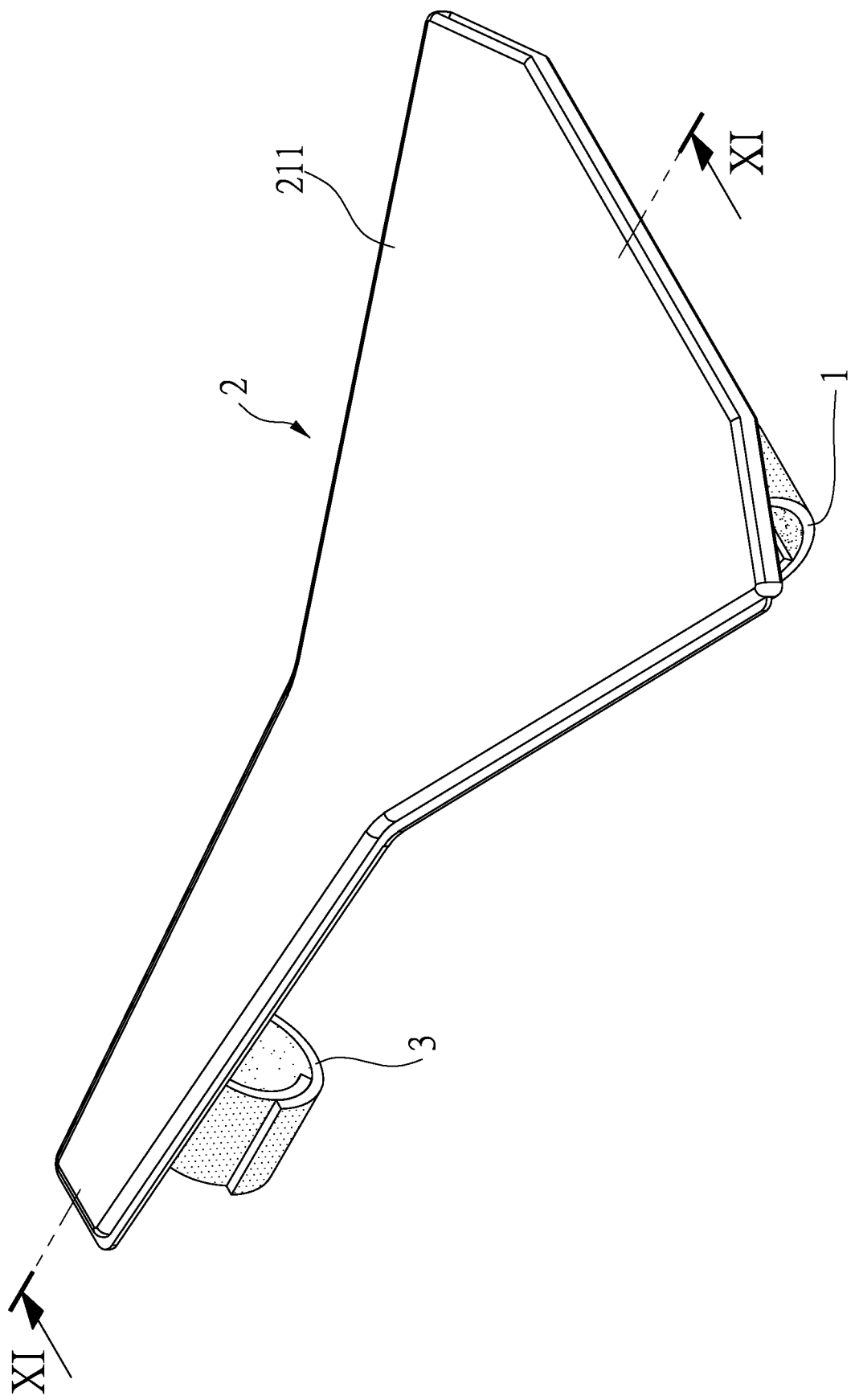
FIG. 1 is a perspective view to show the sweat absorbing device of the present invention.
Figure 2:
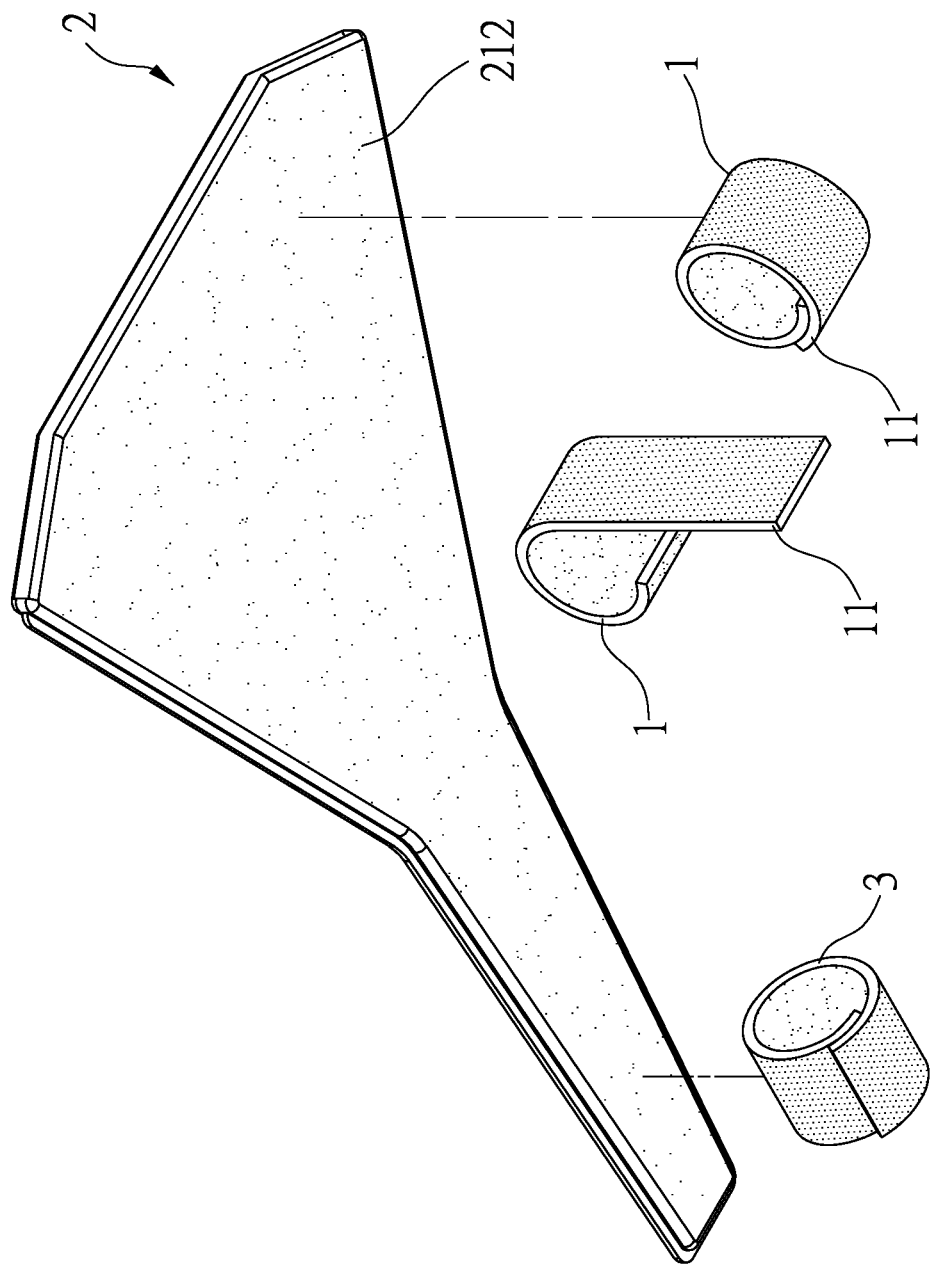
FIG. 2 is an exploded view of the sweat absorbing device of the present invention.

Referring to FIGS. 1 to 5, the sweat absorbing, device of the present invention comprises at least one first strip 1 having a connection end 11 which is connected to a portion of the at least one first strip to form the at least one first strip 1 as a loop. The at least one first strip 1 is removably connected to the handlebar 100 of a bicycle. A sweat absorbing pad 2 has a top face 211 and a bottom face 212, wherein the top face 211 is used to absorb sweat, and the bottom face 212 is to be removably connected to the at least one first strip 1. Preferably, the bottom face 212 of the sweat absorbing pad 2 is a loop- and hook face, and the outside of the at least one first strip 1 is a loop- and hook face.

Figure 3:
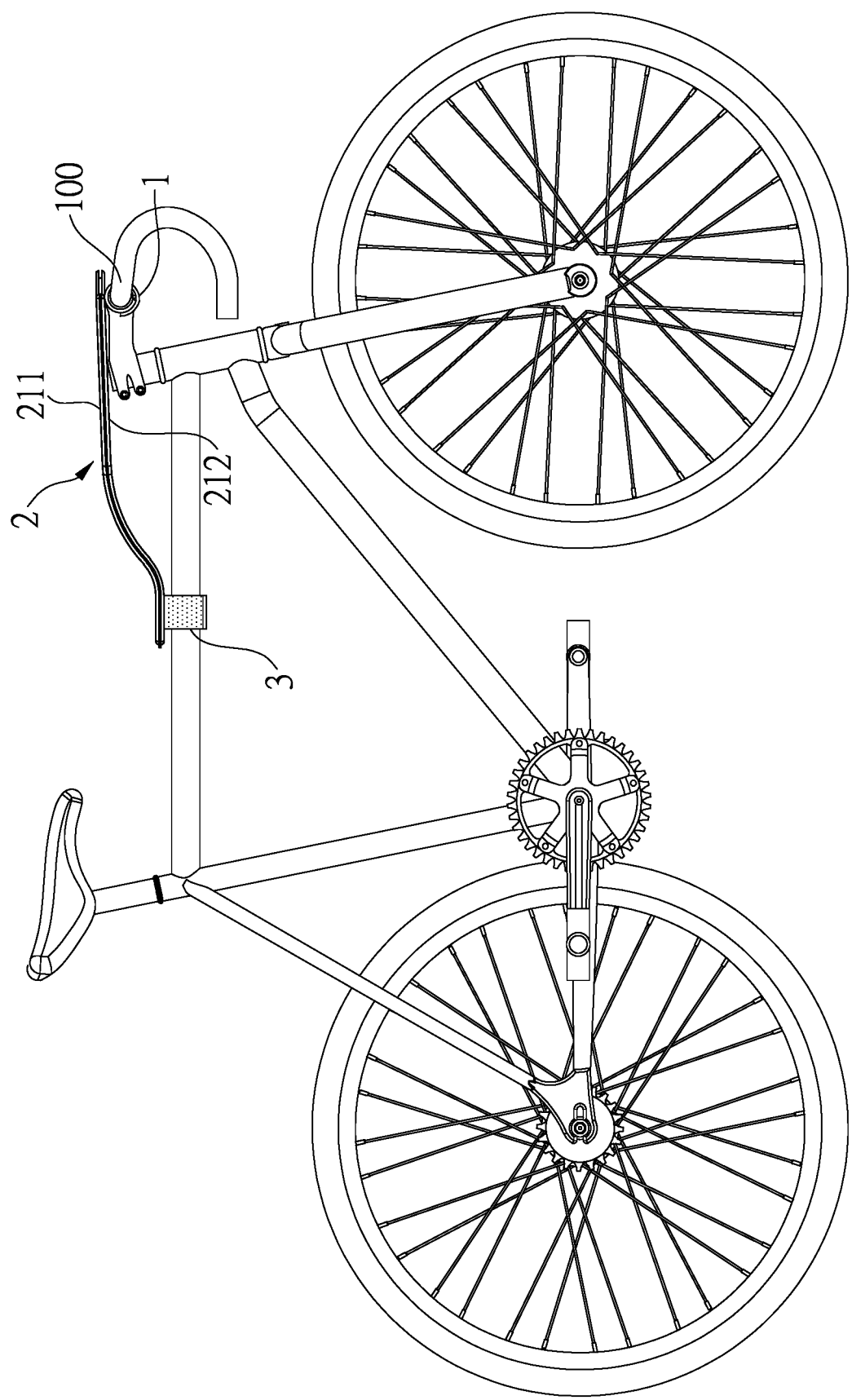
FIG. 3 is a side view to show that the sweat absorbing device of the present invention is installed to a bicycle.
Figure 4:
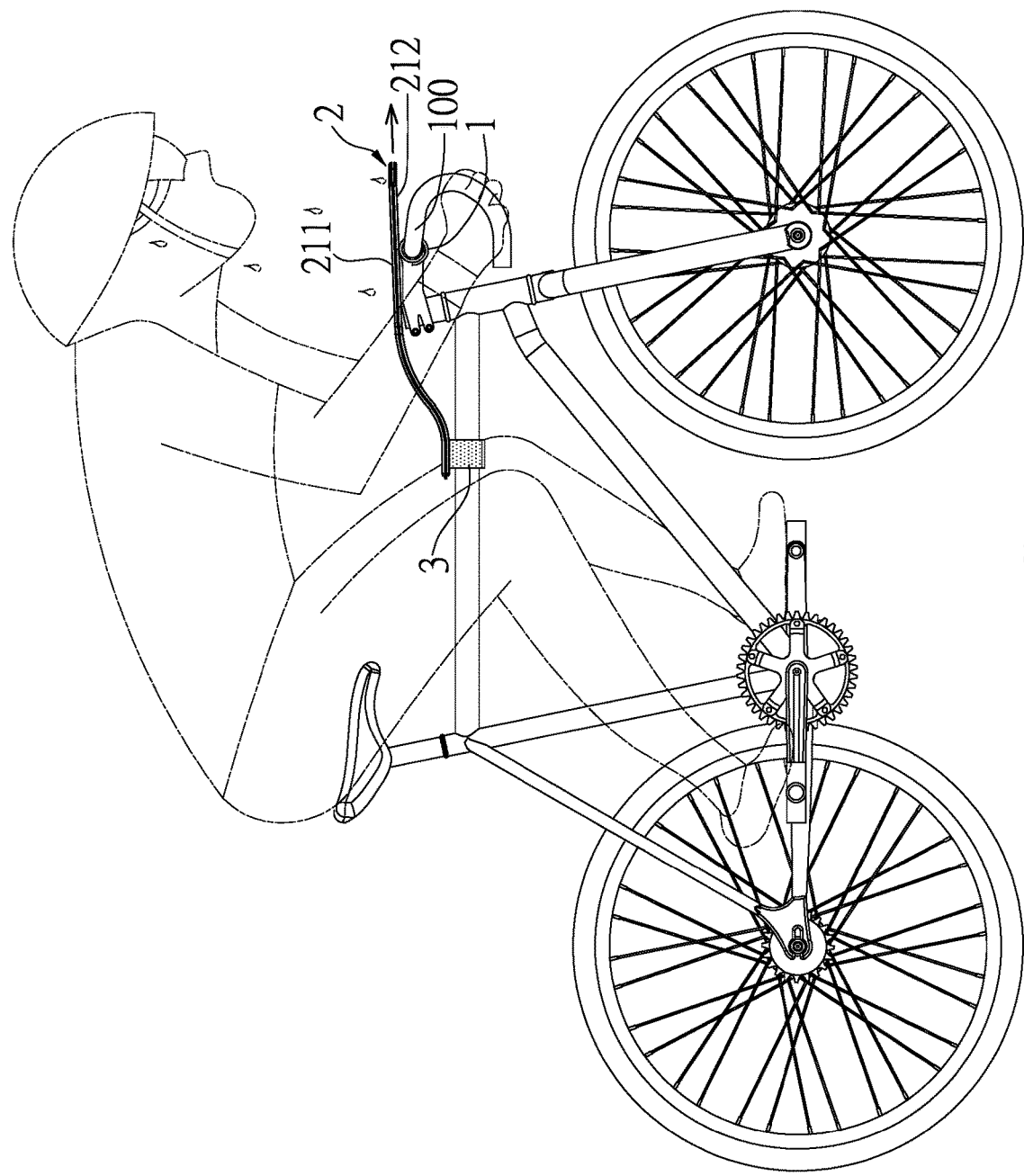
FIG. 4 shows that the sweat absorbing device of the present invention is adjusted forward relative to the bicycle.

As shown in FIG. 3, there are two first strips 1 which are removably connected to the handlebar 100, and the sweat absorbing pad 2 is removably connected to the two first strips 1. A second strip 3 is removably connected to the top tube of the bicycle, and the bottom face 212 is partially and adjustably secured to the second strip 3. By this way, the sweat absorbing pad 2 is well positioned and does not shift. The sweat from the rider is absorbed by the sweat absorbing pad 2. As shown in FIG. 4, when the rider's body moves forward, the sweat absorbing pad 2 can be separated from the first and second strips 1, 3, and then the sweat absorbing pad 2 is re-located to let the sweat absorbing pad 2 is located at a forward position to absorb the sweat from the rider as shown in FIG. 4. Of course, the second strip 3 can moved to a forward position when needed.

Figure 5:
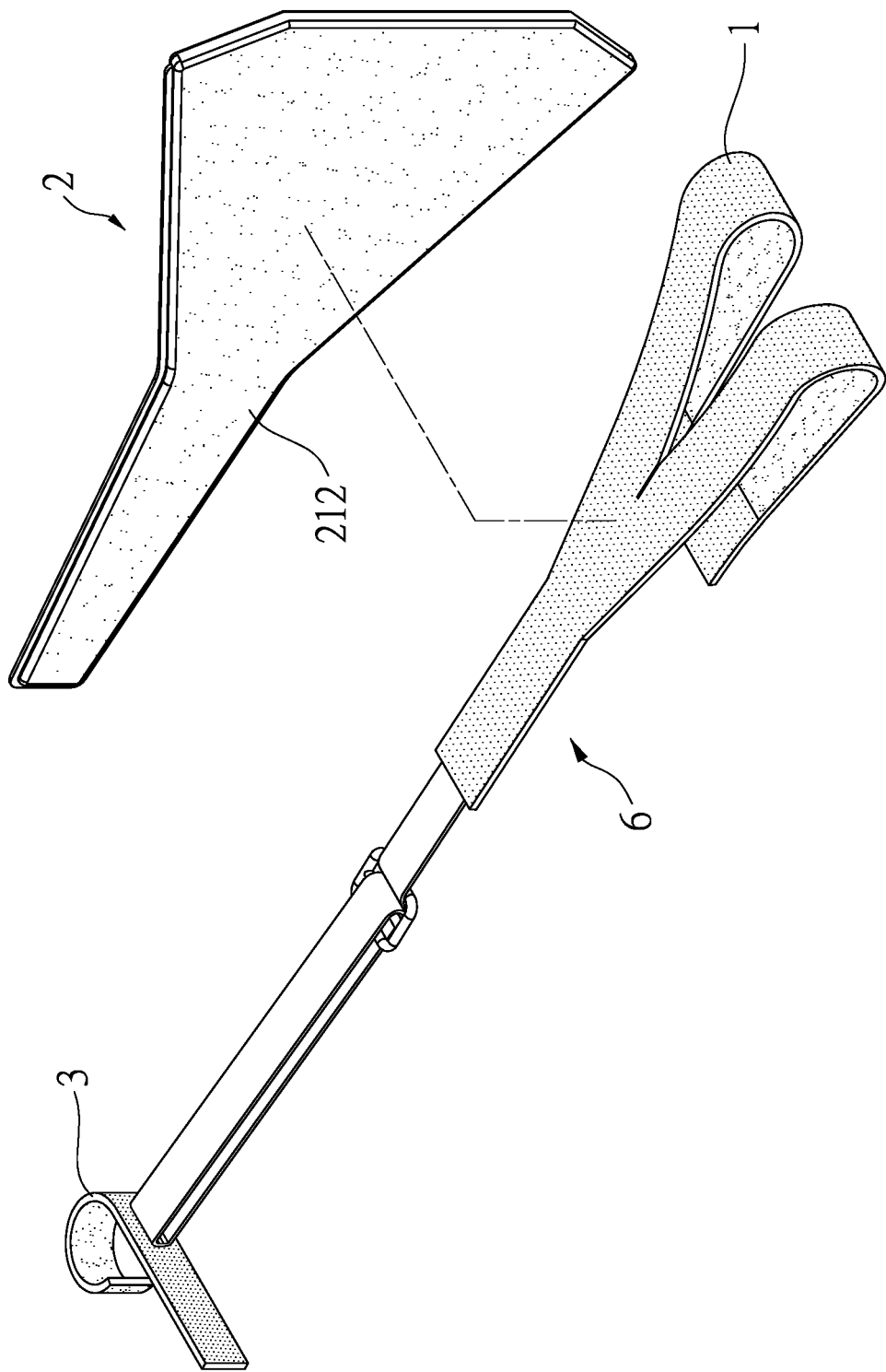
FIG. 5 shows the sweat absorbing, the first strip, the second strip and the extension part.
Figure 6:
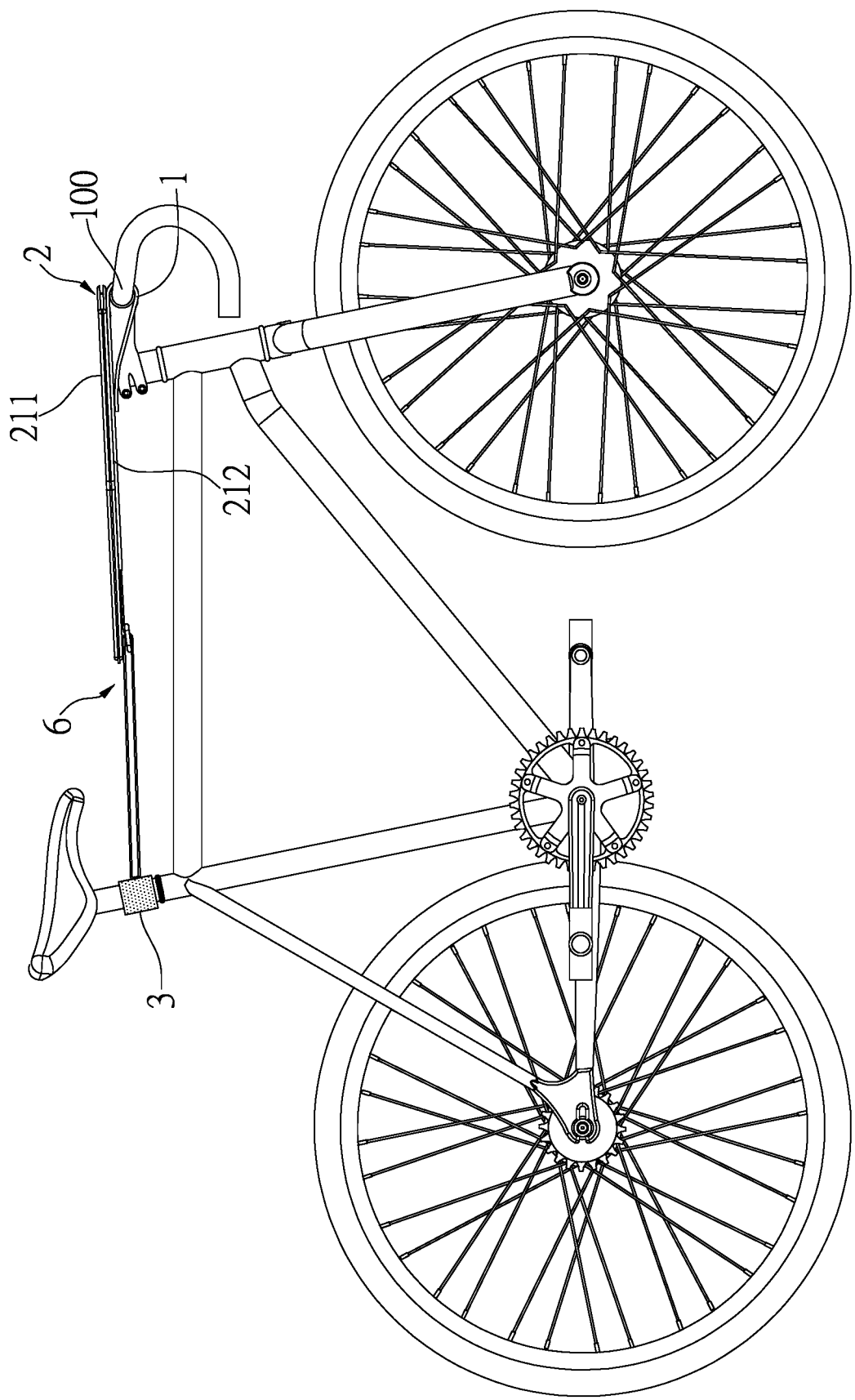
FIG. 6 shows that the bottom face of the sweat absorbing pad is removably connected to the extension part.
Figure 7:
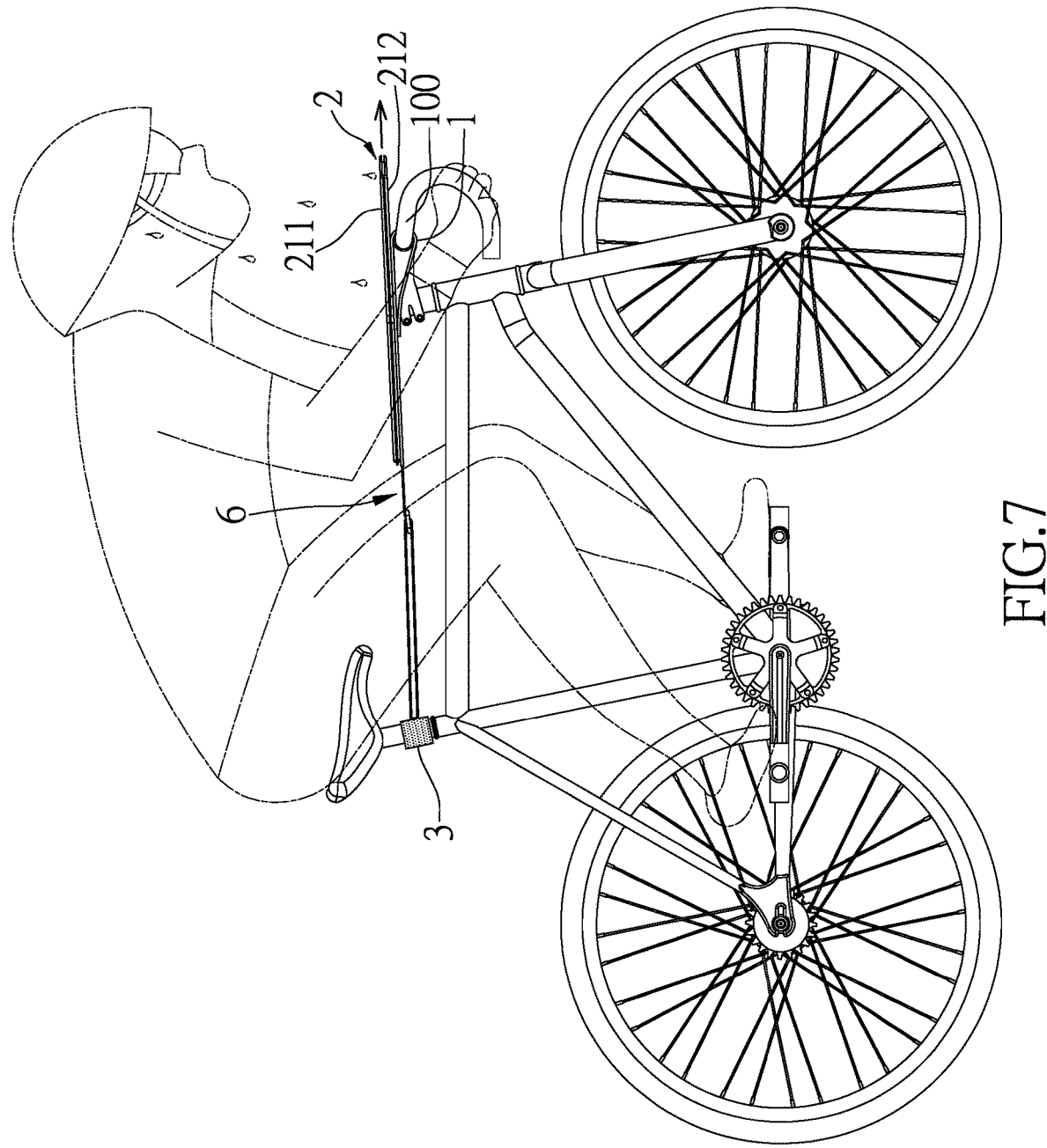
FIG. 7 shows that the bottom face of the sweat absorbing pad is removably connected to the extension part, and the sweat absorbing pad is adjusted forward relative to the bicycle.

FIGS. 5 to 7 show another embodiment, wherein the at least one second strip 3 is connected to the at least one first strip 1 by an extension part 6. The bottom face 212 is partially and adjustably and removably connected to the extension part 6. In this embodiment, there are two first strips 1 which are integrally formed with one of two ends of the extension part 6, and the other one of the two ends of the extension part 6 is adjustably connected to the at least one second strip 3. The at last one second strip 3 is removably connected to the seat post and the extension part 6 is connected between the at least one second strip 3 and the extension part 6 as shown in FIG. 6. The sweat absorbing pad 2 can also be adjusted forward as shown in FIG. 7.

Figure 8:
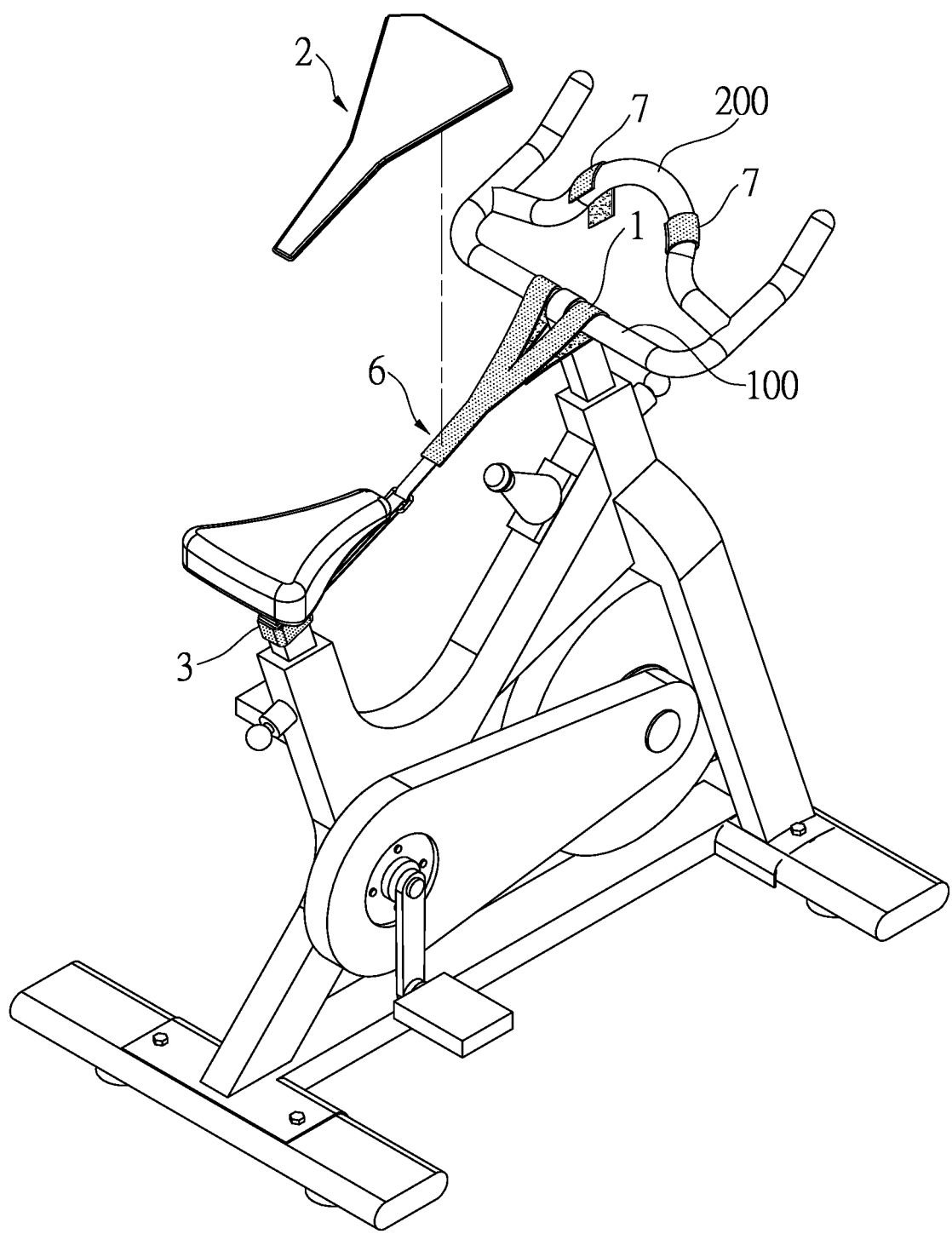
FIG. 8 shows that the sweat absorbing device of the present invention is used to a stationary bike.
Figure 9:
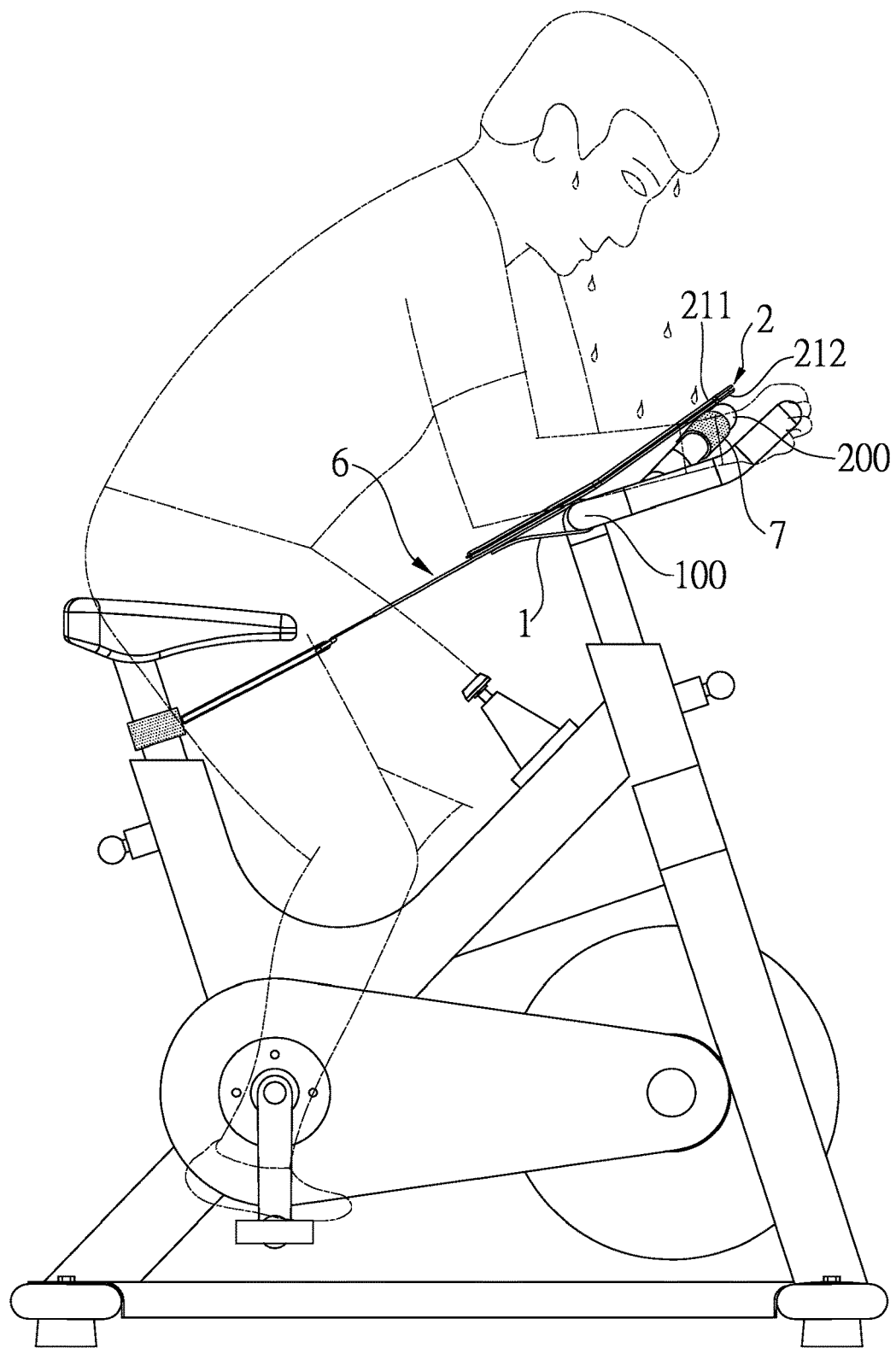
FIG. 9 shows that the sweat absorbing pad is removably connected to the third strip on the arm rest, and the sweat absorbing pad is adjusted forward relative to the stationary bike.

FIG. 8 shows that two third strips 7 are secured to the armrest 700 of the handlebar 100 of a stationary bike. Each of the two third strips 7 includes one end thereof secured to a portion of the third strip 7 to form the third strip 7 as a loop. The bottom twee 212 is partially and adjustably and removably connected to the third strips 7. The sweat absorbing pad 2 is well positioned by the two third strips 7 and the extension part 6.

Figure 10:
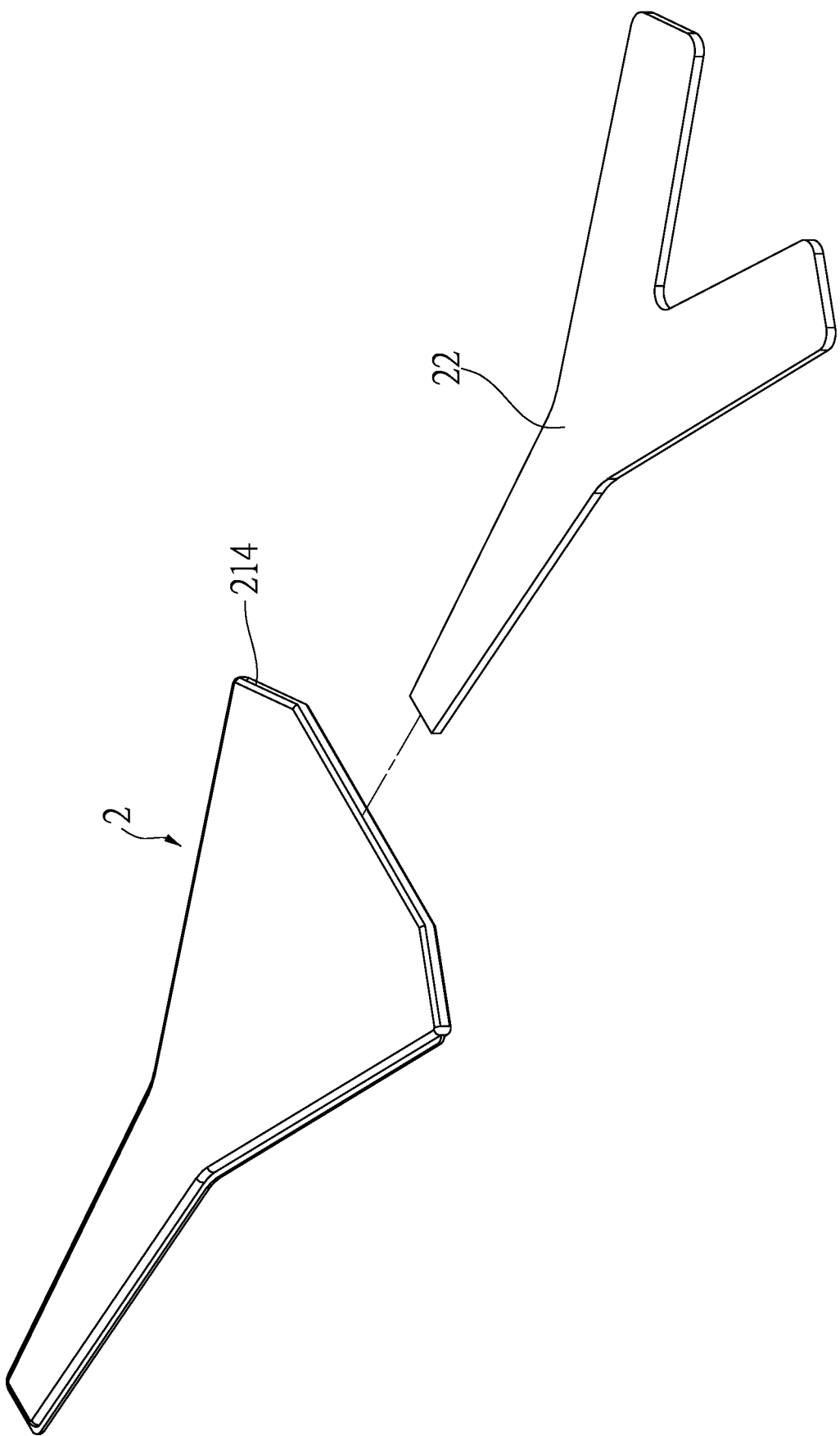
FIG. 10 is an exploded view of the sweat absorbing pad of the present invention.
Figure 11:
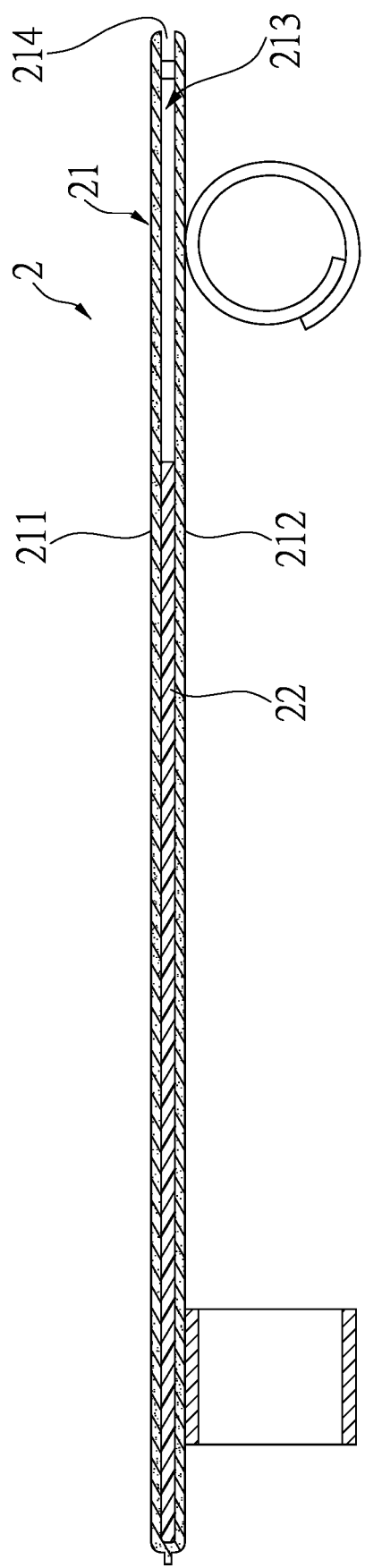
FIG. 11 is a cross sectional view, taken along line XI-XI in FIG. 1.

As shown in FIGS. 10 and 11, the sweat absorbing pad 2 includes a coat 21 and a board 22. The top face 211 is formed on the top of the coat 21. The bottom face 212 is formed to the underside of the coat 21. A room 213 is formed in the coat 21, and the coat 21 includes an opening 214 which communicates with the room 213. The board 22 is located in the room 213. The stiffness of the board 22 is greater than the stiffness of the coat 21, so that the board 22 ensures that the coat 21 is maintained as a fixed shape. The coat 21 is not deformed even absorbing sweat. The coat 21 can be easily cleaned by removing the board 22 from the room 213. The board 22 can be made by PVC.

While we have shown and described the embodiment in accordance with the present invention, it should be clear to those skilled in the art that further embodiments may be made without departing from the scope of the present invention.

What is claimed is:

1. A sweat absorbing device comprising:
   at least one first strip (1) having a connection end (11) which is connected to a portion of the at least one first strip (1) to form the at least one first strip (1) as a loop, the at least one first strip (1) adapted to be removably connected to a handlebar, and
   a sweat absorbing pad (2) including a coat (21) and a board (22), a top face (211) formed on a top of the coat (21), a bottom face (212) formed to an underside of the coat (21), a room (213) formed in the coat (21), the coat (21) including an opening (214) which communicates with the room (213), the board (22) located in the room (213), a stiffness of the board (22) being greater than a stiffness of the coat (21), the at least one first strip (1) being removably connected to the bottom face (212) of the sweat absorbing pad (2).

2. The sweat absorbing device as claimed in claim 1 further comprising a second strip (3) which is adapted to be removably connected to a portion of a bicycle, the bottom face (212) being partially and adjustably and removably connected to the second strip (3).

3. The sweat absorbing device as claimed in claim 1 further comprising a second strip (3), an extension part (6) connected between the second strip (3) and the at least one first strip (1), the bottom face (212) being partially and adjustably connected to the extension part (6).

4. The sweat absorbing device as claimed in claim 1 further comprising a third strip (7) which is adapted to be removably connected to an armrest, the third strip (7) including one end thereof secured to a portion of the third strip (3) to form the third strip (3) as a loop, the bottom face (212) being partially and adjustably removably connected to the third strip (7).

* * * * *